(12) United States Patent
Gitt

(10) Patent No.: US 7,377,191 B2
(45) Date of Patent: May 27, 2008

(54) DOUBLE CLUTCH TRANSMISSION

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 160 days.

(21) Appl. No.: 11/362,607

(22) Filed: Feb. 24, 2006

(65) Prior Publication Data

US 2006/0169077 A1    Aug. 3, 2006

Related U.S. Application Data

(63) Continuation-in-part of application No. PCT/EP2004/008976, filed on Aug. 11, 2004.

(30) Foreign Application Priority Data

Aug. 27, 2003   (DE) ................. 103 39 758

(51) Int. Cl.
*F16H 3/08* (2006.01)
(52) U.S. Cl. .................. 74/330; 74/331
(58) Field of Classification Search .......... 74/330, 74/331
See application file for complete search history.

(56) References Cited

U.S. PATENT DOCUMENTS

| 6,209,406 | B1 * | 4/2001 | Sperber et al. ........... 74/330 |
| 6,250,171 | B1 | 6/2001 | Sperber et al. |
| 6,427,547 | B1 | 8/2002 | Bowen |
| 6,460,425 | B1 * | 10/2002 | Bowen ..................... 74/331 |
| 6,490,944 | B1 * | 12/2002 | Heinzel et al. ........... 74/335 |
| 6,595,077 | B1 * | 7/2003 | Geiberger et al. ........ 74/330 |

FOREIGN PATENT DOCUMENTS

| AT | 190 394 | 6/1957 |
| DE | 925 509 | 3/1955 |
| DE | 31 31 156 | 2/1983 |
| DE | 35 44 415 | 6/1987 |
| DE | 198 21 164 | 11/1991 |
| DE | 41 22 628 | 1/1993 |
| DE | 199 18 732 | 11/2000 |
| DE | 199 39 334 | 3/2001 |
| DE | 100 60 699 | 6/2001 |
| DE | 101 02 028 | 8/2001 |
| DE | 101 08 881 | 9/2002 |
| DE | 103 25 647 | 2/2004 |
| DE | 103 32 210 | 2/2005 |
| EP | 0 883 785 | 8/2002 |
| GB | 2 103 317 | 2/1983 |
| WO | WO 00/39484 | 7/2000 |

OTHER PUBLICATIONS

Dr. Peter Tenberge, "Doppelkupplungsgetriebe in Windungsanordnung", VDI-Seminar No. 31 03 01, Stuttgart, 2001, pp. 1-16.

* cited by examiner

*Primary Examiner*—Dirk Wright
(74) *Attorney, Agent, or Firm*—Klaus J. Bach

(57) ABSTRACT

In a double clutch transmission with a winding path power flux arrangement, which has two countershafts arranged coaxially with respect to one another and with seven forward gears and a plurality of reverse gears, for selected gears the power flux extends from a part region of the transmission forward and then again back to another part region of the transmission in such a way that only four shift clutches are needed for shifting through all the gears.

25 Claims, 7 Drawing Sheets

| Gang | K1 | K2 | S1 | SK1 | S2 | S3 | SK2 | S4 | S5 | SK3 | S6 | S7 | SK4 | S8 |
|------|----|----|----|-----|----|----|-----|----|----|-----|----|----|-----|----|
| R3 | ● |   |   | -   |   | ● |     |   |   |     | ● |   | -   |   |
| R2 |   | ● |   | -   |   | ● |     |   |   |     | - |   | -   |   |
| R1 | ● |   |   | -   |   | ● |     |   | ● |     |   | ● |     |   |
| V1 | ● |   |   |     | ● |   | -   |   | ● |     |   | ● |     |   |
| V2 |   | ● |   |     | ● |   | -   |   |   |     |   |   | -   |   |
| V3 | ● |   |   | -   |   |   |     | ● |   | -   |   | ● |     |   |
| V4 |   | ● |   | -   |   |   |     | ● | ● |     |   |   | -   |   |
| V5 | ● |   |   | -   |   |   | -   |   |   | -   |   |   |     | ● |
| V6 |   | ● | ● |     |   |   |     |   |   | -   |   |   | -   |   |
| V7 | ● |   | ● |     |   |   |     |   |   |     | ● |   | -   |   |

V1

V2

V3

V4

V5

V6

V7

R1

R2

R3

| Gang | K1 | K2 | S1 | | S2 | S3 | | S4 | S5 | | S6 | S7 | | S8 |
|---|---|---|---|---|---|---|---|---|---|---|---|---|---|---|
| R3 | ● | | | - | | ● | | | | | ● | | - | |
| R2 | | ● | | - | | ● | | | ● | - | | | - | |
| R1 | ● | | | - | | ● | | | ● | | | ● | | |
| V1 | ● | | | | ● | | - | | ● | | | ● | | |
| V2 | | ● | | | ● | | - | | | - | | | - | |
| V3 | ● | | | - | | | | ● | | - | | ● | | |
| V4 | | ● | | - | | | | ● | ● | | | | - | |
| V5 | ● | | | - | | | - | | | - | | | | ● |
| V6 | | ● | ● | | | | - | | | - | | | - | |
| V7 | ● | | ● | | | | - | | | | ● | | - | |

| Gang | K1 | K2 | S1 | | S2 | S3 | | S4 | S5 | | S6 | S7 | | S8 |
|---|---|---|---|---|---|---|---|---|---|---|---|---|---|---|
| R 1 | | ● | | - | | ● | | | | - | | ● | | |
| V1 | ● | | | | ● | | | ● | | | ● | | - | |
| V2 | | ● | | | ● | | | - | | | - | | - | |
| V3 | ● | | | - | | | - | | | | ● | ● | | |
| V4 | | ● | | - | | | | ● | | - | | ● | | |
| V5 | ● | | | - | | | - | | ● | | | ● | | |
| V6 | | ● | ● | | | | | | | | - | | - | |
| V7 | ● | | | - | | | - | | | | | | | ● |

| Gang | K1 | K2 | S1 | | S2 | S3 | | S4 | | S5 | S6 | | S7 |
|---|---|---|---|---|---|---|---|---|---|---|---|---|---|
| R3 | ● | | | - | | ● | | | | ● | ● | | |
| R2 | | ● | | - | | ● | | | - | | | - | |
| R1 | ● | | | - | | ● | | | | ● | | | ● |
| V1 | ● | | | | ● | | - | | | ● | | | ● |
| V2 | | ● | | | ● | | - | | - | | | - | |
| V3 | ● | | | - | | | | ● | | | | | ● |
| V4 | | ● | | - | | | | ● | | ● | | - | |
| V5 | ● | | | - | | | | ● | - | | ● | | |
| V6 | | ● | ● | | | | - | | - | | | - | |
| V7 | ● | | ● | | | | - | | | ● | ● | | |

DOUBLE CLUTCH TRANSMISSION

This is a Continuation-In-Part Application of International Application PCT/EP2004/008976 filed 11 Aug. 2004 and claiming the priority of German application 103 39 758.2 filed 27 Aug. 2003.

BACKGROUND OF THE INVENTION

The invention relates to a double clutch transmission, which has two countershafts arranged coaxially with respect to one another, and to a method of shifting such a transmission.

Such a double clutch transmission is already known from the publication by Tenberge, P.: "Doppelkupplungsgetriebe in Windungsanordnung" ["Double clutch transmission in a winding arrangement"], VDI-Seminar No. 31 03 01 "Stufenlose Fahrzeuggetriebe" ["Continuously variable vehicle transmissions"], Stuttgart, 2001.

DE 103 25 647 A1, not yet published, likewise already shows a double clutch transmission in a winding arrangement. In this, however, the countershafts are arranged parallel to one another.

Furthermore, double clutch transmissions are known from EP 0 883 785 B1, DE 101 02 028 A1, WO 00/39484, U.S. Pat. No. 6,250,171 B1, DE 199 39 334 A1, DE 198 21 164 A1, DE 101 08 881 A1 and U.S. Pat. No. 6,427,547 B1.

The double clutch transmissions described in these publications have various disadvantages. Thus, some double clutch transmission concepts have a relatively large overall length. Furthermore, in most cases, only one reverse gear is implemented.

It is the object of the present invention to provide an axially short double clutch transmission, which is free of interruption in traction during shifting and which has a relatively high number of gears, particularly for use with commercial vehicles.

SUMMARY OF THE INVENTION

In a double clutch transmission with a winding path power flux arrangement, which has two countershafts arranged coaxially with respect to one another and with seven forward gears and a plurality of reverse gears, for selected gears the power flux extends from a part region of the transmission forward and then again back to another part region of the transmission in such a way that only four shift clutches are needed for shifting through all the gears.

Such double clutch transmissions are suitable particularly for commercial vehicles because of the large number of forward and reverse gears.

In the following description a high transmission ratio is called a short gear and a low transmission ratio is also called a long gear.

In an especially advantageous refinement of the invention, the double clutch transmission has an odd number of forward gears, the first forward gear being a winding-path transmission gear, wherein the power path through the transmission may switch between the main transmission shaft and the counter shaft several times. In particular, seven forward gears may be provided as an odd number of forward gears. This refinement avoids the following dilemma which occurs when the first and the highest forward gears are implemented via the same input gear set. Without a winding-path first forward gear, a first possibility for the transmission design would be to design the respective input transfer or transmission gear set to be very short in a disadvantageous way, so that, overall, a sufficiently short first forward gear, that is, a sufficiently high transmission ratio is obtained. The second transfer of the highest forward gear would then disadvantageously have to be designed to be very long, so that a sufficient spread is obtained or this highest forward gear has, overall, a sufficiently long transfer. Furthermore, owing to the short input transfer or transmission constant, the torque is disadvantageously increased sharply already in the first transfer stage, so that all the components which follow in the force flux are subjected to a high torque load. If, in contrast to the first possibility, the respective input transfer is designed to be relatively long, so that the second transfer stage of the highest forward gear does not have to be extremely long, it is necessary, however, to design the second transfer stage of the first forward gear to be extremely short, so that, overall, a first forward gear with a sufficiently short transfer ratio is obtained.

Since, in an advantageous refinement, the first and the seventh forward gear both belong to the group of odd gears, the power flux thereof can pass, via the same input transfer or transmission constant. The abovementioned dilemma can be avoided by the utilization of two additional transfer stages in the first forward gear, if said additional transfer stages result, overall, in a step-down transfer. A relatively long input transfer or transmission constant can then be adopted, so that the second gearing stage of the seventh gear does not have to be selected to be extremely long, and nevertheless a sufficiently short first forward gear can be implemented. Moreover, all the components lying downstream of the input transfer for the odd forward gears in the force flux are subjected to lower load than if this were designed to be shorter than the input transfer for the even forward gears.

In a refinement of the invention, one forward gear extends solely via the two transmission constants as transfer stages. In this case, a pair of gearwheels can be saved, since there is no need for a specific separate pair of gearwheels in order to implement the second transfer stage. This affords advantages in terms of the weight, costs and axial length of the transmission. This forward gear may be, in particular, the seventh forward gear.

If the first forward gear is designed as a winding-path gear, one transfer stage can be used both in the first and in the second forward gear. As a result, as compared with a "conventional" transmission with only two transfer stages lying in the power flux in all forward gears, a further pair of gearwheels can be saved. This affords advantages in terms of the weight, costs and axial length of the transmission.

In further refinements, a further transfer stage may be used in each case in two gears, in particular, the fourth and the fifth forward gear, so that a further pair of gearwheels can be saved. Furthermore, a shift clutch, for example synchronization or a dog clutch may be dispensed with. This affords advantages in terms of the weight, costs and axial length of the transmission.

In a refinement of the invention, the first reverse gear can be implemented, similarly to the first forward gear, by means of two additional gearwheel stages, that is to say, overall, 5 gearwheel stages, so that here, too, a short transfer, at the same time with a comparatively long input transfer, is possible.

The implementation of a second reverse gear is also possible in refinements of the invention. On account of the basic type of construction of the transmission according to the invention, in some embodiments, there is no need for additional outlay in mechanical terms in the form of additional gearwheels or shift clutches.

In some exemplary embodiments, it is even possible to implement a third reverse gear. In this case, on account of the basic type of construction of the transmission, there is no need for additional outlay in mechanical terms in the form of additional gearwheels or shift clutches.

The progressive ratio transfer between the first two reverse gears advantageously corresponds, in some versions, to the progressive ratio transfer between the first and second forward gear. The additional reverse gear or at least one of the additional reverse gears may be used
either as "reverse overdrive" or
as a standard reverse gear for winter conditions.

Thus, in winter conditions, the spinning of the tires on smooth ground as a result of too high a drive torque output at the tires can be prevented.

In an especially advantageous refinement, the transition between the two/three reverse gears may be designed to be power-shiftable, so that the shift operation can be executed comfortably without deceleration.

In an especially advantageous way, the front input transfer, that is to say that the transfer gear set adjacent to the double clutch, may be designed to be longer than a second input transfer. In other words, a front first transmission constant possesses the larger driving gearwheel than a rear second transmission constant. As a result, the mounting concept described in DE 103 32 210.8-12 can be employed; therefore a compact mounting of the shafts in the front region of the transmission can be achieved. This is accompanied by the advantage that there is no need for any additional intermediate support wall. The contents of Ser. No. 11/331831 are hereby also deemed to be incorporated in this application.

An arrangement by means of which shifting can occur between all the reverse gears without interruption in traction, is especially advantageous.

During the change from the power flux into the load-free part transmission, a shift clutch can be left engaged, even though this is not absolutely necessary for the gear currently selected. When this shift clutch left engaged outside the power flux is then required again in a subsequent forward shift or backshift, this shift clutch does not have to be actuated. Shifts can consequently be carried out especially quickly and with reduced wear. This method may be employed both in reverse and forward gears and also during the change between forward and reverse gears.

Further advantages of the invention will become apparent from the following description on the basis of the accompanying drawings:

DESCRIPTION OF VARIOUS EMBODIMENTS

Figures 1, 2:
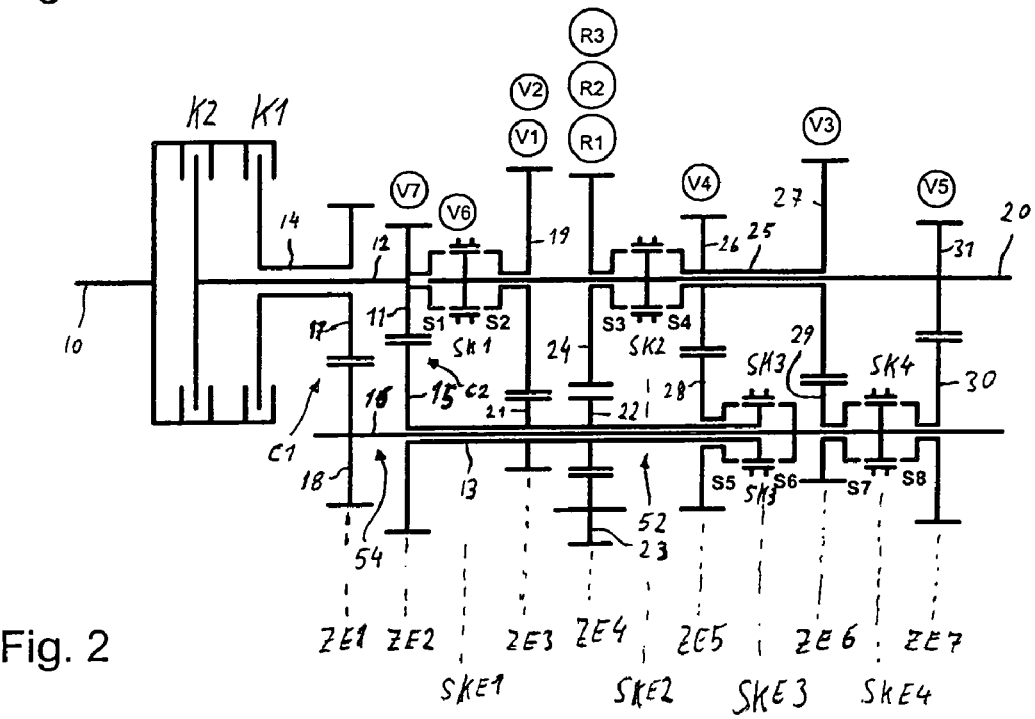
FIG. 1 shows a double clutch transmission in a first embodiment.
FIG. 2 shows a shift diagram of the double clutch transmission according to FIG. 1.

The expressions:
"front" and "rear" and
"first to seventh gearwheel plane"
are used below.

In this context, "front" is the direction pointing forward during the forward travel of the motor vehicle, whereas "rear" is correspondingly the opposite direction. In the drawing, "front" is illustrated on the left and "rear" on the right.

The "first to seventh gearwheel plane" in this case counts from front to rear.

A gearwheel plane ZE is a plane in which at least two intermeshing gearwheels are arranged. A gearwheel plane consisting of at least two intermeshing gearwheels forms a transfer stage. This also applies when there is a transfer of i=1:1. In the practical implementation of the transmission diagrams illustrated, it may be, particularly in the case where three gearwheels intermesh in a gearwheel plane, that the gearwheels are not arranged exactly in one plane for reasons of construction space or dimensioning. Such a reason would be, for example, different tooth widths on the two countershafts, the reason for which are different torques to be transmitted. For example, a gearwheel may also be designed with a width such that it meshes with different mating gearwheels in two gearwheel planes.

The expression "shift clutch plane SKE" used in connection with the invention means, here, that at least one shift clutch SK is located in one plane. In the practical implementation of the transmission diagrams illustrated, it may be, particularly in the case where at least two shift clutches are located in one shift clutch plane, that the shift clutches are not arranged exactly in one plane for reasons of construction space. The construction space may, for example be predetermined by the installation position of a shift actuator assembly for the displacement of the shift clutches for the purpose of a gear change.

FIG. 1 shows a double clutch transmission in a first embodiment, which is used in a rear drive or multi-axle drive of a motor vehicle, the engine and double clutch transmission of which are installed longitudinally in the direction of travel. This motor vehicle may be, in particular, a high-torque passenger car or a commercial vehicle.

In the double clutch transmission, an input shaft 10 is connected to a transmission output shaft 20 by means of a first part transmission 54 and a second part transmission 52. The two part transmissions 52 and 54 are arranged parallel to one another in the power flux. The part transmissions 52, 54 possess in each case a power-shift friction clutch K1, K2 and in each case an intermediate shaft 12, 14, of which the first intermediate shaft 14 is designed as a radially outer hollow shaft and the second intermediate shaft 12 as a radially inner intermediate shaft 12. The intermediate shafts 12, 14 are arranged concentrically with respect to one another,
coaxially with respect to the input shaft 10 and
coaxially with respect to, or in alignment with, the transmission output shaft 20 and can in each case be connected operatively to the input shaft 10 via the power-shift clutch K1, K2. The mounting of the shafts takes place, as described in Ser. No. 11/331831.

The second intermediate shaft 12 of the second part transmission 52 is coupleable fixedly in terms of rotation to the transmission output shaft 20 in a position S1 by means of a first engageable and disengageable shift clutch SK1 in order to form a direct sixth forward gear V6. Furthermore, this intermediate shaft 12 has a driving gearwheel 11 of a second transmission constant C2, said driving gearwheel meshing with a driven gearwheel 15 of the second transmission constant C2. The second transmission constant C2 consequently forms a second gearwheel plane ZE2. The driven gearwheel 15 of this transmission constant C2 is arranged fixedly in terms of rotation and coaxially on a hollow shaft 13 of the second part transmission 52, through which an inner shaft 16 of the first part transmission 54 extends.

This inner shaft 16 has, at its front end, a coaxial driven gearwheel 18 of a first transmission constant C1, said driven gearwheel 18 meshing with a driving gearwheel 17 of the first transmission constant C1. This driving gearwheel 17 is fixed in terms of rotation and coaxial with respect to the first intermediate shaft 14. Its transmission constant C1 forms a first gearwheel plane ZE1.

The first transmission constant C1 forms the first input transfer which is assigned to four odd forward gears V1, V3, V5, V7 and to two odd reverse gears R1, R3. By contrast, the second transmission constant C2 forms a second input transfer which is assigned to three even forward gears V2, V4, V6 and to one even reverse gear R2.

The second gearwheel plane ZE2 is followed by the first shift clutch plane SKE1 in which said shift clutch SK1 is arranged axially between the driving wheel 11 of the second transmission constant C2 and a loose wheel 19. This loose wheel 19, coaxially arranged rotatably on the transmission output shaft 20, is coupled fixedly in terms of rotation to the transmission output shaft 20 in a position S2 of the shift clutch SK1. The loose wheel 19 meshes, in a third gearwheel plane ZE3, with a smaller gearwheel 21 which is connected fixedly in terms of rotation to the hollow shaft 13 of the second part transmission 52.

Arranged behind this gearwheel 21, axially adjacent to the latter, is a gearwheel 22 of a fourth gearwheel plane ZE4 which is assigned to three reverse gears R1, R2 and R3. This gearwheel 22 meshes with an intermediate wheel 23 which is offset in parallel and which is arranged rotatably. This intermediate wheel 23 meshes with a loose wheel 24 which is arranged coaxially and rotatably on the transmission output shaft 20. Axially behind this loose wheel 24 is arranged a second shift clutch SK2 by means of which this loose wheel 24 can be coupled fixedly in terms of rotation to the transmission output shaft 20 in a position S3.

Axially behind the shift clutch SK2, arranged in a second shift clutch plane SKE2, is arranged a second hollow shaft 25 which is connected fixedly in terms of rotation to the transmission output shaft 20 in a position S4 of the second shift clutch SK2. The second hollow shaft 25 is connected fixedly in terms of rotation in a front fifth gearwheel plane ZE5, to a gearwheel 26 which is smaller than a gearwheel 27 connected fixedly in terms of rotation to the hollow shaft 26 at the rear end of the latter. The front gearwheel 26 meshes with a gearwheel 28 arranged coaxially and rotatably on the first hollow shaft 13 of the second part transmission 52. Axially behind this gearwheel 28 lies the third shift clutch plane SKE3. with the shift clutch SK3 which can be actuated forward into the position S5 in order to make a rotationally fixed connection between the first hollow shaft 13 and this gearwheel 28.

This shift clutch SK3 can be actuated rearward in order to make a rotationally fixed connection to a gearwheel 29 mounted rotatably and coaxially on the inner shaft 16. This gearwheel 29 meshes, in a sixth gearwheel plane ZE6, with said gearwheel 27 at the rear end of the second hollow shaft 25.

Behind the sixth gearwheel plane ZE6 lies the seventh gearwheel plane ZE7 in which a loose wheel 30 is arranged rotatably and coaxially on the inner shaft 16 and a fixed wheel 31 is arranged fixedly in terms of rotation and coaxially at the end of the transmission output shaft 10.

Axially between the last two gearwheel planes ZE6 and ZE7, the fourth shift clutch SK4 is arranged coaxially with respect to the inner shaft 16 in the fourth shift clutch plane SKE4. By means of this shift clutch SK4, in a front position S7, the gearwheel 29 and alternately,
in a rear position S8, the loose wheel 30 can be coupled fixedly in terms of rotation to the inner shaft 16.

FIG. 2 shows a shift diagram of the double clutch transmission according to FIG. 1. This is described below by means of FIG. 2, with reference to FIG. 3 to FIG. 12 for the individual gears V1 to V7 and R1 to R3:

In the first forward gear V1
the first power-shift clutch K1 is engaged,
the first shift clutch SK1 is in the rear position S2,
the second shift clutch SK2 is in the neutral position,
the third shift clutch SK3 is in the front position S5, and
the fourth shift clutch SK4 is in the front position S7.

Figure 3:
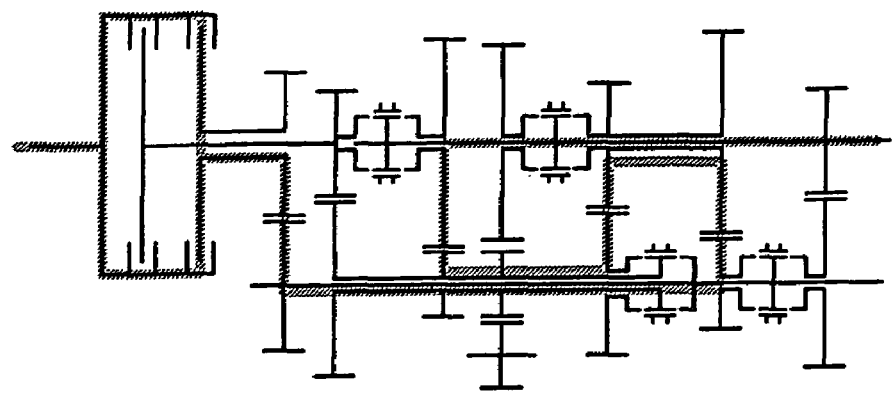
FIG. 3 shows the double clutch transmission according to FIG. 1, the power flux in the first forward gear being illustrated by hatching.
Figure 4:
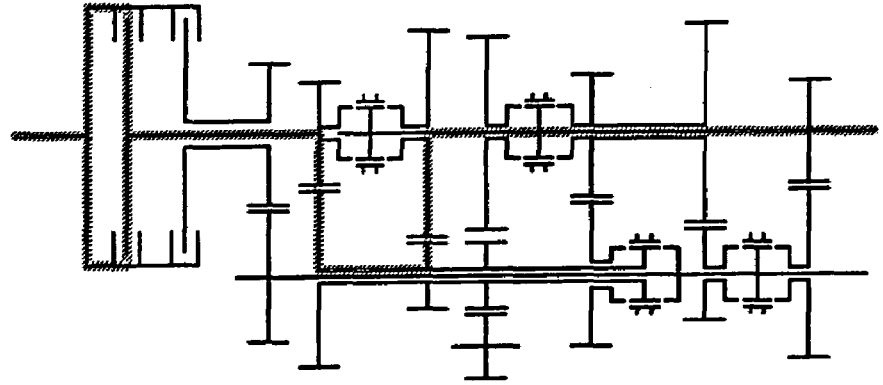
FIG. 4 shows the double clutch transmission according to FIG. 1, the power flux in the second forward gear being illustrated by hatching.

As is evident in FIG. 3, the first forward gear V1 is a winding path gear. The power flux in this case runs axially,
first five gearwheel planes rearward,
then three gearwheel planes forward, and
thereafter, as far as the transmission output.
In detail, the power flux extends successively
from the transmission input shaft 10, via the first power-shift clutch K1,
via the first intermediate shaft 14,
via the first transmission constant C1,
via the inner shaft 16,
via the sixth gearwheel plane ZE6,
via the second hollow shaft 25,
via the fifth gearwheel plane ZE5,
via a part region of the first hollow shaft 13, and
via the third gearwheel plane ZE3 to the transmission output shaft 20.
In the second forward gear V2,
the second power-shift clutch K2 is engaged,
the first shift clutch SK1 is in the rear position S2,
the second shift clutch SK2 is in the neutral position,
the third shift clutch SK3 is likewise in the neutral position, and
the fourth shift clutch SK4 is likewise in the neutral position.
Consequently, only one shift clutch SK1 is engaged.
The second forward gear V2 is in this case not designed a winding path gear. As is shown in FIG. 4, the power flux of the second forward gear V2 consequently runs successively
from the transmission input shaft 10,
via the second power-shift clutch K2,
via the second intermediate shaft 12,
via the second transmission constant C2,
via a front part region of the hollow shaft 13, and
as the last transfer stage, just as in the first forward gear V1, via the third gearwheel plane ZE3, to the transmission output shaft 20.
In the third forward gear V3
the first power-shift clutch K1 is engaged,
the first shift clutch SK1 is in the neutral position,
the second shift clutch SK2 is in the rear position S4,
the third shift clutch SK3 is in the neutral position, and
the fourth shift clutch SK4 is in the front position S7.

Figure 5:
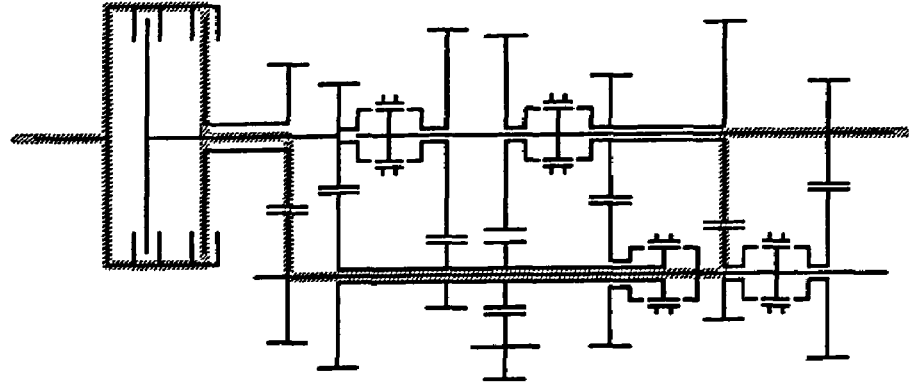
FIG. 5 shows the double clutch transmission according to FIG. 1, the power flux in the third forward gear being illustrated by hatching.

The third forward gear V3 is in this case not a winding path gear. As shown in FIG. 5, the power flux of the third forward gear V3 consequently extends successively
from the transmission input shaft 10,
via the first power-shift clutch K1,
via the first intermediate shaft 14,
via the first transmission constant C1,
via a front part region of the inner shaft 16, and
as the last transfer stage, via the sixth gearwheel plane ZE6, to the transmission output shaft 20.
In the fourth forward gear V4,
the second power-shift clutch K2 is engaged,
the first shift clutch SK1 is in the neutral position,
the second shift clutch SK2 is in the rear position S4,
the third shift clutch SK3 is in the front position S5, and
the fourth shift clutch SK4 is in the neutral position.

Figure 6:
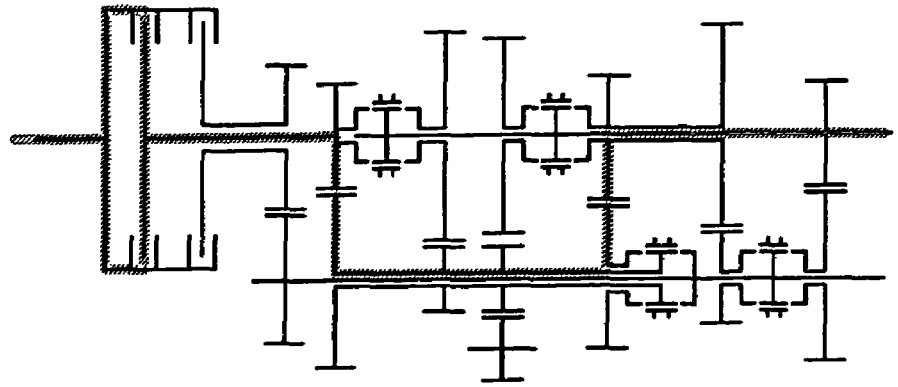
FIG. 6 shows the double clutch transmission according to FIG. 1, the power flux in the fourth forward gear being illustrated by hatching.

The fourth forward gear V4 is in this case not a winding path gear. As shown in FIG. 6, the power flux of the fourth forward gear V4 consequently extends successively
from the transmission input shaft 10,
via the second power-shift clutch K2,
via the second intermediate shaft 12,
via the second transmission constant C2,
via a large part of the hollow shaft 13, and
as the last transfer stage, via the fifth gearwheel plane ZE5, to the transmission output shaft 20.

In the fifth forward gear V5,
the first power-shift clutch K1 is engaged,
the first shift clutch SK1 is in the neutral position,
the second shift clutch SK2 is in the neutral position,
the third shift clutch SK3 is in the neutral position, and
the fourth shift clutch SK4 is in the rear position S8.

Consequently, only one shift clutch SK4 is engaged.
The fifth forward gear V5 is not a winding path gear.

Figure 7:
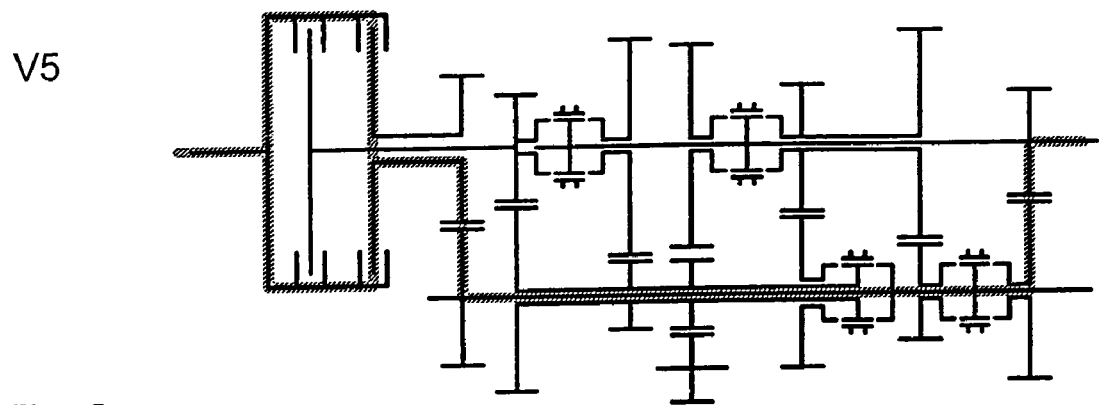
FIG. 7 shows the double clutch transmission according to FIG. 1, the power flux in the fifth forward gear being illustrated by hatching.
Figure 8:
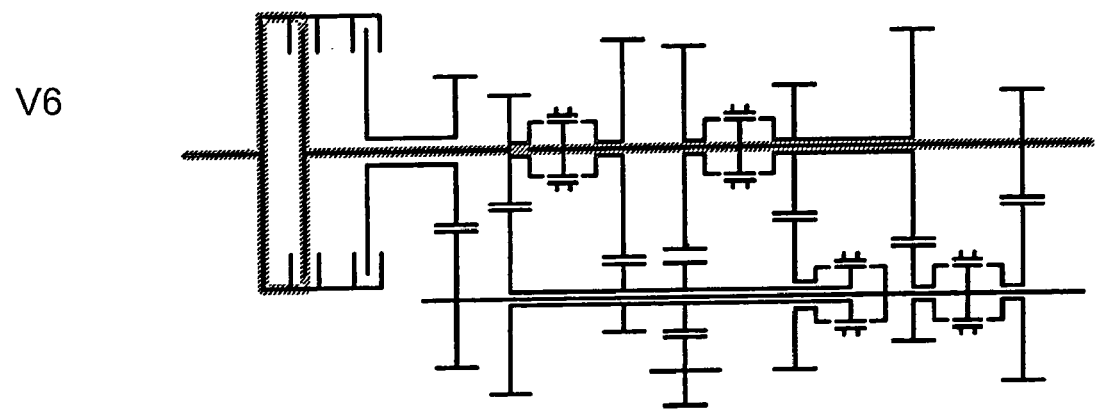
FIG. 8 shows the double clutch transmission according to FIG. 1, the power flux in the sixth forward gear being illustrated by hatching.

As is evident in FIG. 7, the power flux of the fifth forward gear V5 consequently runs successively
from the transmission input shaft 10,
via the first power-shift clutch K1,
via the first intermediate shaft 14,
via the first transmission constant C1,
via a large part of the inner shaft 16, and
as the last transfer stage, via the seventh and consequently rearmost gearwheel plane ZE7, to the transmission output shaft 20.
In the sixth forward gear V6, the second power-shift clutch K2 is engaged. Just as in the case of the fifth forward gear V5, in the sixth forward gear V6, too, only one shift clutch is engaged. This, in the case of the sixth forward gear V6, is the first shift clutch SK1 which is in the front position S1. The three remaining shift clutches SK2, SK3, SK4 are in the neutral position. It is evident in FIG. 8 that the sixth forward gear V6 is a direct forward gear. In this direct forward gear, the second intermediate shaft 12 is connected fixedly in terms of rotation to the transmission output shaft 20, so that the sixth forward gear V6 has a transfer ratio of 1:1.
In the seventh forward gear V7,
the first power-shift clutch K1 is engaged,
the first shift clutch SK1 is in the front position S1,
the second shift clutch SK2 is in the neutral position,
the third shift clutch SK3 is in the rear position S6, and
the fourth shift clutch SK4 is in the neutral position.

Figure 9:
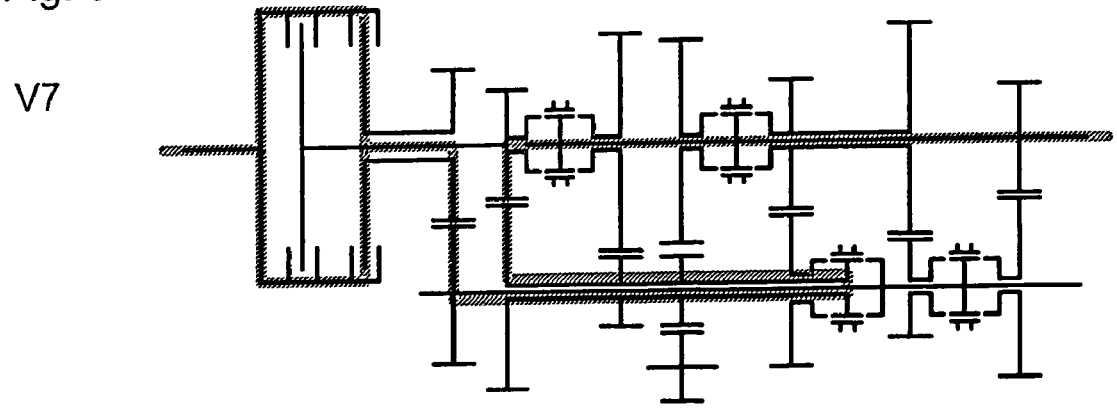
FIG. 9 shows the double clutch transmission according to FIG. 1, the power flux in the seventh forward gear being illustrated by hatching.

As shown in FIG. 9, the seventh forward gear V7 is not a winding-path gear. However, just as in the case of the first forward gear V1, the power flux runs axially back and forth in a part region.
The power flux in this case runs axially,
first four gearwheel planes rearward,
then three gearwheel planes forward, and,
thereafter, as far as the transmission output.
In detail, the power flux extends successively
from the transmission input shaft 10,
via the first power-shift clutch K1,
via the first intermediate shaft 14,
via the first transmission constant C1,
via the inner shaft 16,
via the shift clutch SK3 which couples the inner shaft 16 fixedly in terms of rotation to the first hollow shaft 13 at its rear end, and
as the last transfer stage, via the second gearwheel plane ZE2 in which the transmission constant C2 lies, to the transmission output shaft 20.
In the first reverse gear R1
the first power-shift clutch K1 is engaged,
the first shift clutch SK1 is in the neutral position,
the second shift clutch SK2 is in the front position S3,
the third shift clutch SK3 is in the front position S5, and
the fourth shift clutch SK4 is in the front position S7.

Figure 10:
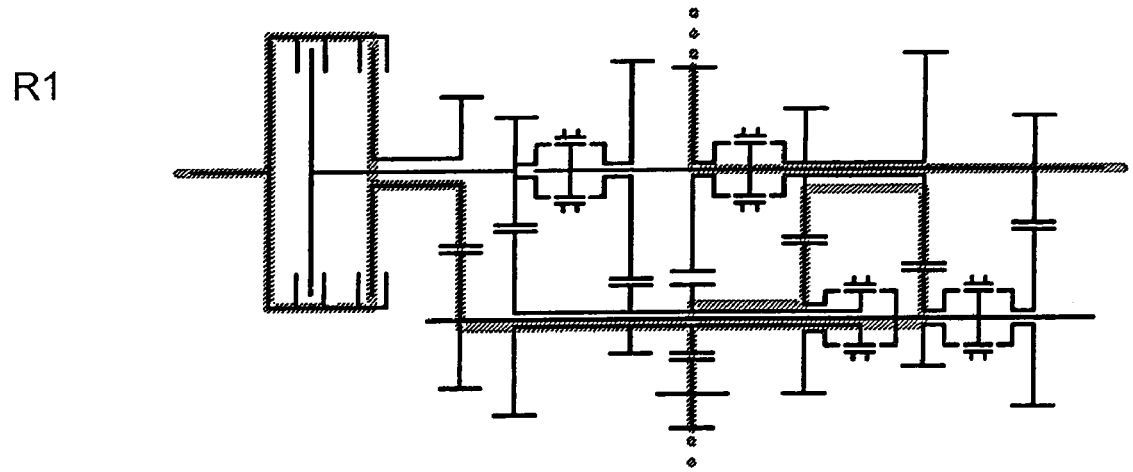
FIG. 10 shows the double clutch transmission according to FIG. 1, the power flux in the first reverse gear being illustrated by hatching.

As shown in FIG. 10, the first reverse gear R1 is a winding path gear. The power flux in this case runs axially,
first five gearwheel planes rearward,
then two gearwheel planes forward, and,
thereafter, as far as the transmission output.
In detail, the power flux extends successively
from the transmission input shaft 10,
via the first power-shift clutch K1,
via the first intermediate shaft 14,
via the first transmission constant C1,
via the inner shaft 16,
via the sixth gearwheel plane ZE6,
via the second hollow shaft 25,
via the fifth gearwheel plane ZE5,
via a part region of the first hollow shaft 13, and
via the three gearwheels 22, 23, 24 in the fourth gearwheel plane ZE4,
to the transmission output shaft 20.

The power flux, shown in FIG. 10, of the first reverse gear R1 therefore runs very similarly to the power flux, shown in FIG. 3, of the first forward gear V1, so that virtually identical transfer ratios are obtained.

In the second reverse gear R2,
the second power-shift clutch K2 is engaged,
the first shift clutch SK1 is in the neutral position,
the second shift clutch SK2 is in the front position S3,
the third shift clutch SK3 is in the neutral position, and
the fourth shift clutch SK4 is in the neutral position.

Consequently, only one shift clutch SK2 is engaged.

The second reverse gear R2 is, in this case, not a winding path gear. As is shown in FIG. 11, the power flux of the second reverse gear R2 consequently runs successively
from the transmission input shaft 10,
via the second power-shift clutch K2,
via the second intermediate shaft 12,
via the second transmission constant C2,
via a front part region of the hollow shaft 13, and
as the last transfer stage, just as in the first reverse gear R1, via the three gearwheels 22, 23, 24 of the fourth gearwheel plane ZE4, to the transmission output shaft 20.

Figure 11:
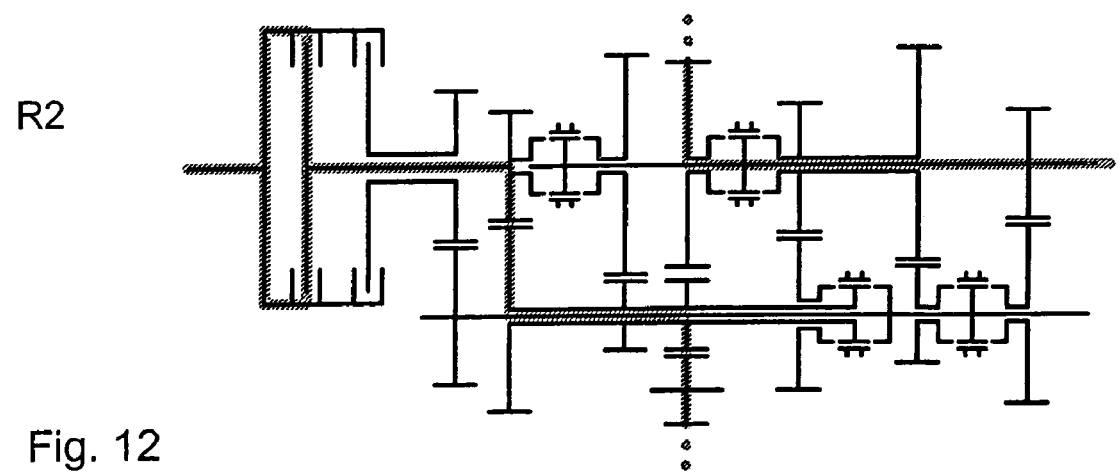
FIG. 11 shows the double clutch transmission according to FIG. 1, the power flux in the second reverse gear being illustrated by hatching.

The power flux, evident in FIG. 11, of the second reverse gear R2 therefore runs very similarly to the power flux, evident in FIG. 4, of the second forward gear V2, so that virtually identical transmission ratios are obtained.

In the third reverse gear R3,
the first power-shift clutch K1 is engaged,
the first shift clutch SK1 is in the neutral position,
the second shift clutch SK2 is in the front position S3,
the third shift clutch SK3 is in the rear position S6, and
the fourth shift clutch SK4 is in the neutral position.

Figure 12:
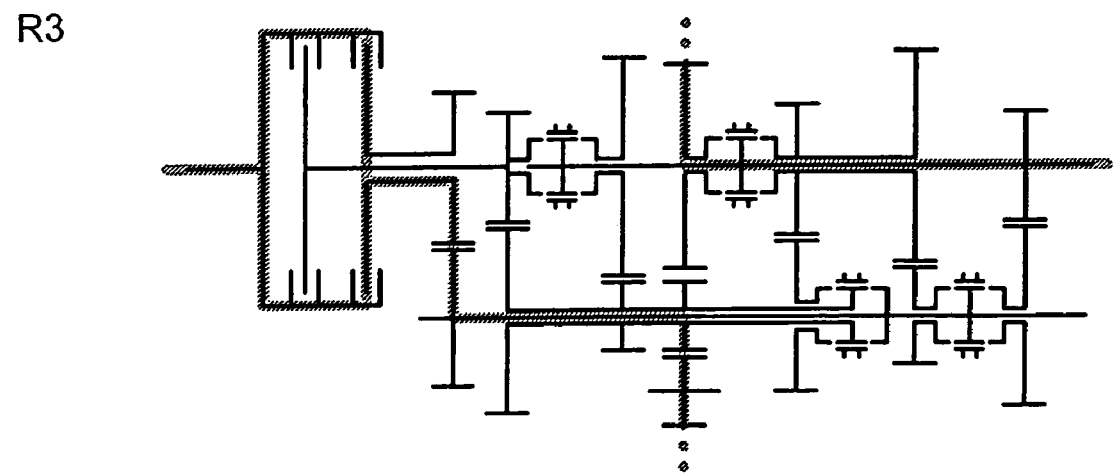
FIG. 12 shows the double clutch transmission according to FIG. 1, the power flux in the third reverse gear being illustrated by hatching.

As is evident in FIG. 12, the third reverse gear R3 is not a winding path gear. In detail, the power flux extends successively
from the transmission input shaft 10,
via the first power-shift clutch K1,
via the first intermediate shaft 14,
via the first transmission constant C1,
via the inner shaft 16,
via the shift clutch SK3 which couples the inner shaft 16 fixedly in terms of rotation to the first hollow shaft 13 at its rear end, and
as the second transfer stage, via the three gearwheels 22, 23, 24 of the fourth gearwheel plane ZE4, to the transmission output shaft 20.

Consequently, for a change within the reverse gears, besides the overlap control of the double clutch, only one shift clutch is to be actuated. To be precise, for a change from the second reverse gear R2 into the third reverse gear R3, this is the shift clutch SK3. For an R3→R2 shift, likewise only the shift clutch SK3 is to be actuated.

In an especially advantageous further version of the first embodiment, in the change from the power flux into the load-free part transmission, a shift clutch is left engaged, even though this is not absolutely necessary for the gear currently selected. Specifically, during the change from the first forward gear V1 into the second forward gear V2, the shift clutch SK4 then located in the load-free part transmission 54 remains engaged in the position S7. Consequently, on the one hand, only a single shift clutch, to be precise SK3, has to be actuated in order to change from the first forward gear V1 into the second forward gear V2. That is to say, the shift clutch SK3 is actuated into the neutral position. On the other hand, for the probably subsequently following shift into the third forward gear V3, the shift clutch SK4 no longer has to be actuated, since it is then in the correct position S7 in the power flux again as a result of the change to the power shift clutch K1. This affords an advantage in terms of the shift time and the wear of the shift clutches. This version can in this case be employed in all forward gears and/or reverse gears in which shift clutches SK to be selected later are located in the load-free part transmission. It is even possible to carry out a gear change without the actuation of a single shift clutch SK. Merely an overlap control of the double clutch is sufficient to bring about the gear change. This shift method may be adopted both in up-shifts and in down-shifts.

Figures 13, 14:
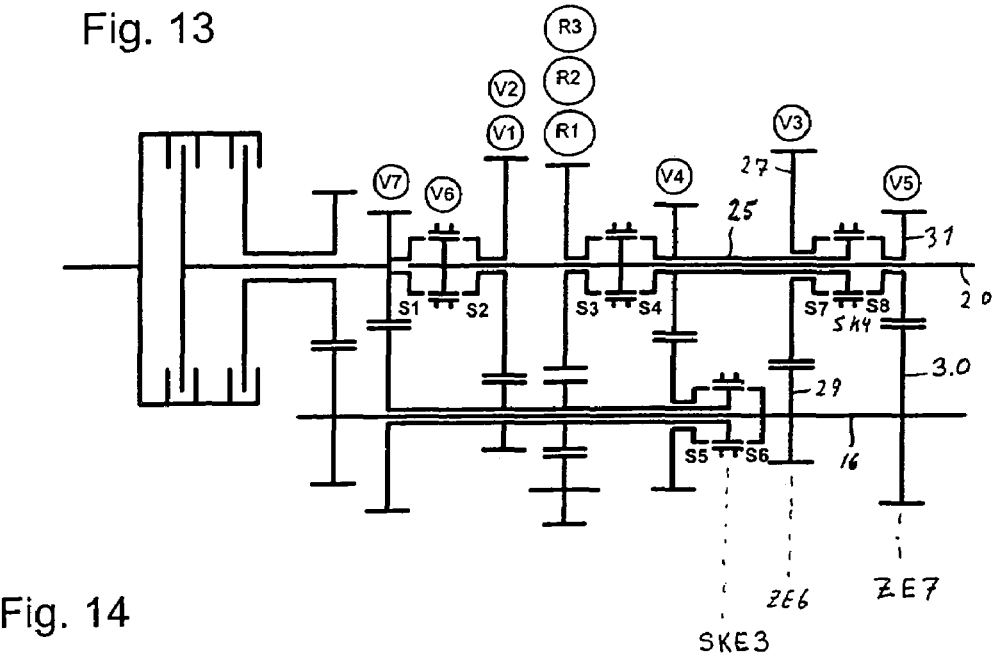
FIG. 13 shows a double clutch transmission in a second embodiment.
FIG. 14 shows a shift diagram of the double clutch transmission according to FIG. 13.

FIG. 13 shows a double clutch transmission in a second embodiment.

The construction of this double clutch transmission is identical, from the front as far as the third shift clutch plane SKE3 to the first embodiment, and therefore reference to the latter is made here.

However, a fourth shift clutch SK4 is arranged coaxially with respect to the transmission input shaft 20. By means of this shift clutch SK4, on the one hand, in a position S7, a gearwheel 27 arranged rotatably and coaxially on the second hollow shaft 25 in a sixth gearwheel plane ZE6 can be connected fixedly in terms of rotation to the hollow shaft 25. On the other hand, in a position S8, an axially adjacent gearwheel 31 arranged rotatably and coaxially on the transmission output shaft 20 in a seventh gearwheel plane ZE7 can be connected fixedly in terms of rotation to the transmission output shaft 20.

A fixed wheel 29 arranged coaxially and fixedly in terms of rotation on the inner shaft 16 meshes with the gearwheel 27 in the sixth gearwheel plane ZE6. A fixed wheel 30 which is arranged axially adjacently to the gearwheel 29 and which is arranged coaxially and fixedly in terms of rotation on the inner shaft 16 meshes with the gearwheel 31 in the seventh gearwheel plane ZE7.

Consequently, as compared with the first embodiment, stated in simplified form, the fourth shift clutch SK4 is on the transmission output shaft 20 instead of on the inner shaft 16. The gearwheels 29 and 30, designed as loose wheels in the first embodiment, are designed as fixed wheels in the second embodiment. By contrast, the gearwheels 27 and 31, designed in the first embodiment to be permanently fixed in terms of rotation with respect to their shafts 25 and 20 respectively, are designed as loose wheels in the second embodiment.

FIG. 14 shows a shift diagram of the double clutch transmission according to FIG. 13. This shift diagram is identical to the shift diagram, shown in FIG. 2, of the double clutch transmission according to the first embodiment.

Figures 15, 16:
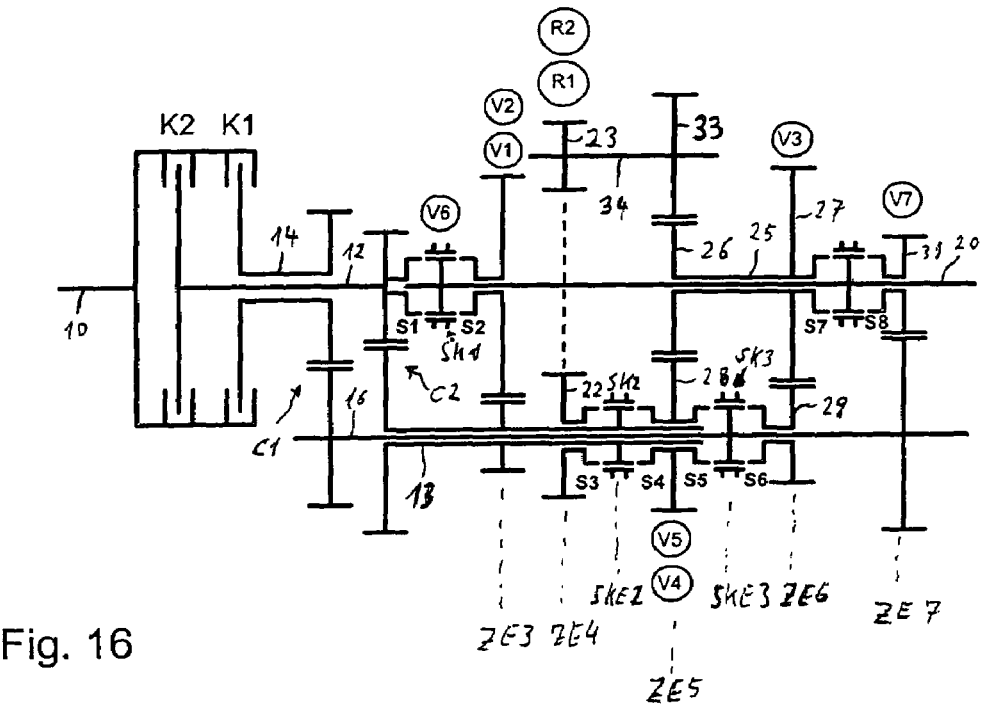
FIG. 15 shows a double clutch transmission in a third embodiment.
FIG. 16 shows a shift diagram of the double clutch transmission according to FIG. 15.

FIG. 15 shows a double clutch transmission in a third embodiment.

The construction of this double clutch transmission is identical, from the front as far as the third shift clutch plane SKE3, to the first and the second embodiment, and therefore reference is made here, in this respect, to both of these. As regards the seventh gearwheel plane ZE7, reference is made to the second embodiment since this is identical in the region of the seventh gearwheel plane ZE7.

In contrast to the preceding embodiments, only two intermeshing gearwheels are arranged in the gearwheel plane ZE4 assigned to the single reverse gear R1. One of these two gearwheels is a loose wheel 22 which is arranged rotatably and coaxially on the first hollow shaft 13. The other gearwheel is an intermediate wheel 23 which, in contrast to the preceding exemplary embodiments, does not have a direct output to a gearwheel in the fourth gearwheel plane ZE4, but, by means of a second intermediate wheel 33, has an output via a co-directional transfer ratio to a gearwheel 26 which lies in the gearwheel plane ZE5 lying axially behind it. For this purpose, the second intermediate wheel 33 likewise lies in the fifth gearwheel plane ZE5 and is coupled fixedly in terms of rotation to the first intermediate wheel 23 via an intermediate shaft 34. While, on the one hand, the intermediate wheel 33 meshes with the gearwheel 26 which is arranged rotatably and coaxially on the transmission output shaft 20, on the other hand, a loose wheel 28 meshes with the gearwheel 26. This loose wheel 28 is arranged rotatably and coaxially on the first hollow shaft 13 and in the fifth gearwheel plane ZE5. A shift clutch SK2 is arranged in the second shift clutch plane SKE2 between this loose wheel 28 and the loose wheel 22. The shift clutch SK2 is displaceable forward into a position S3 for the rotationally fixed connection of the first hollow shaft 13 to the loose wheel 22. By contrast, when the shift clutch SK2 is displaced rearward, the latter, in a position S4, makes a rotationally fixed connection between the first hollow shaft 13 and the loose wheel 28.

Behind this loose wheel 28, a third shift clutch SK3 lies in a third shift clutch plane SKE3. Its synchronizing body is arranged fixedly in terms of rotation on the inner shaft 16, so that, by means of this shift clutch SK3, in the event of forward displacement into position S5, a rotationally fixed connection can be made between said inner shaft 16 and the loose wheel 28. By contrast, with the shift clutch SK3 displaced rearward into a position S6, then, by means of this, a rotationally fixed connection is made between the inner shaft 16 and a loose wheel 29 which is arranged coaxially and rotatably on the inner shaft 16 and which lies in a sixth gearwheel plane ZE6. This loose wheel 29 meshes with a loose wheel 27 arranged rotatably and coaxially on the transmission output shaft 20 in the same gearwheel plane ZE6. This loose wheel 27 is permanently connected fixedly in terms of rotation to the loose wheel 26 lying in front of it by means of a second hollow shaft 25. A fourth shift clutch SK4 lies coaxially and fixedly in terms of rotation with respect to the transmission output shaft 20 behind the two loose wheels 27, 26 coupled to one another. This shift clutch SK4 is displaceable forward in order to make a rotationally fixed connection between the transmission output shaft 20 and the loose wheel 27. The shift clutch SK4 is displaceable rearward in order to make a rotationally fixed connection between the transmission output shaft 20 and the loose wheel 31 in the seventh gearwheel plane ZE7.

FIG. 16 shows a shift diagram of the double clutch transmission according to FIG. 15. This is described below for the individual forward gears V1 to V7 and the reverse gear R1:

In the first forward gear V1,
  the first power-shift clutch K1 is engaged,
  the first shift clutch SK1 is in the rear position S2,
  the second shift clutch SK2 is in the rear position S4,
  the third shift clutch SK3 is in the rear position S6, and
  the fourth shift clutch SK4 is in the neutral position.

In this case, the first forward gear V1 is a winding path gear. The power flux in this case runs axially,
  first five gearwheel planes rearward,
  then three gearwheel planes forward, and
  thereafter, as far as the transmission output.

In detail, the power flux runs successively
  from the transmission input shaft 10,
  via the first power-shift clutch K1,
  via the first intermediate shaft 14,
  via the first transmission constant C1,
  via the inner shaft 16,
  via the sixth gearwheel plane ZE6,
  via the second hollow shaft 25,
  via the fifth gearwheel plane ZE5,
  via a part region of the first hollow shaft 13, and
  via the third gearwheel plane ZE3, to the transmission output shaft 20.

In the second forward gear V2,
  the second power-shift clutch K2 is engaged,
  the first shift clutch SK1 is in the rear position S2,
  the second shift clutch SK2 is in the neutral position,
  the third shift clutch SK3 is likewise in the neutral position, and
  the fourth shift clutch SK4 is likewise in the neutral position.

Consequently, only the shift clutch SK1 is engaged.

The second forward gear V2 is in this case not a winding path gear. The power flux of the second forward gear V2 consequently runs successively,
  from the transmission input shaft 10,
  via the second power-shift clutch K2,
  via the second intermediate shaft 12,
  via the second transmission constant C2,
  via a front part region of the hollow shaft 13, and
  as the last transfer stage, just as in the first forward gear V1, via the third gearwheel plane ZE3, to the transmission output shaft 20.

In the third forward gear V3,
  the first power-shift clutch K1 is engaged,
  the first shift clutch SK1 is in the neutral position,
  the second shift clutch SK2 is in the neutral position,
  the third shift clutch SK3 is in the rear position S6, and
  the fourth shift clutch SK4 is in the front position S7.

The third forward gear V3 is in this case not a winding path gear. The power flux of the third forward gear V3 consequently runs successively,
  from the transmission input shaft 10,
  via the first power-shift clutch K1,
  via the first intermediate shaft 14,
  via the first transmission constant C1,
  via a front part region of the inner shaft 16, and as the last transfer stage, via the sixth gearwheel plane ZE6, to the transmission output shaft 20.

In the fourth forward gear V4,
the second power-shift clutch K2 is engaged,
the first shift clutch SK1 is in the neutral position,
the second shift clutch SK2 is in the rear position S4,
the third shift clutch SK3 is in the neutral position, and
the fourth shift clutch SK4 is in the front position S7.

The fourth forward gear V4 is in this case not a winding path gear. The power flux of the fourth forward gear V4 consequently runs successively,
from the transmission input shaft 10,
via the second power-shift clutch K2,
via the second intermediate shaft 12,
via the second transmission constant C2,
via a large part of the hollow shaft 13, and
as the last transfer stage, via the fifth gearwheel plane ZE5, to the transmission output shaft 20.

In the fifth forward gear V5,
the first power-shift clutch K1 is engaged,
the first shift clutch SK1 is in the neutral position,
the second shift clutch SK2 is in the neutral position,
the third shift clutch SK3 is in the front position S5, and
the fourth shift clutch SK4 is in the front position S7.

The fifth forward gear V5 is in this case not a winding path gear. The power flux of the fifth forward gear V5 consequently runs successively,
from the transmission input shaft 10,
via the first power-shift clutch K1,
via the first intermediate shaft 14,
via the first transmission constant C1,
via a large part of the inner shaft 16, and
as the last transfer stage, just as in the fourth forward gear V4, via the fifth gearwheel plane ZE5, to the transmission output shaft 20.

In the sixth forward gear V6, the second power-shift clutch K2 is engaged. Just as in the case of the seventh forward gear V7 explained further below, in the sixth forward gear V6, too, only one shift clutch is engaged. In the case of the sixth forward gear V6, this is the first shift clutch SK1 which is located in the front position S1. The three remaining shift clutches SK2, SK3, SK4 are located in the neutral position. The sixth forward gear V6 is consequently designed as a direct forward gear. In this direct forward gear, the second intermediate shaft 12 is connected fixedly in terms of rotation to the transmission output shaft 20, so that the sixth forward gear V6 has a transfer ratio of 1:1.

In the seventh forward gear V7,
the first power-shift clutch K1 is engaged,
the first shift clutch SK1 is in the neutral position,
the second shift clutch SK2 is in the neutral position,
the third shift clutch SK3 is in the neutral position, and
the fourth shift clutch SK4 is in the rear position S8.

In detail, the power flux runs successively,
from the transmission input shaft 10,
via the first power-shift clutch K1,
via the first intermediate shaft 14,
via the first transmission constant C1,
via the inner shaft 16, and
via the seventh gearwheel plane ZE7, to the transmission output shaft 20.

In the single reverse gear R1,
the second power-shift clutch K2 is engaged,
the first shift clutch SK1 is in the neutral position,
the second shift clutch SK2 is in the front position S3,
the third shift clutch SK3 is in the neutral position, and
the fourth shift clutch SK4 is in the front position S7.

The reverse gear R1 is in this case not a winding path gear. Since the power flux described below runs via the second power-shift clutch K2, a shift free of interruption in traction is possible between the first forward gear V1 running via the first power-shift clutch K1 and the reverse gear R1. Said power flux runs successively
from the transmission input shaft 10,
via the second power-shift clutch K2,
via the second intermediate shaft 12,
via the second transmission constant C2,
via a front part region of the hollow shaft 13, and
via the fourth gearwheel plane ZE4 assigned to the reverse gear R2,
via the intermediate shaft 34 and,
as the last transfer stage, via the fifth gearwheel plane ZE5, to the transmission output shaft 20.

Figures 17, 18:
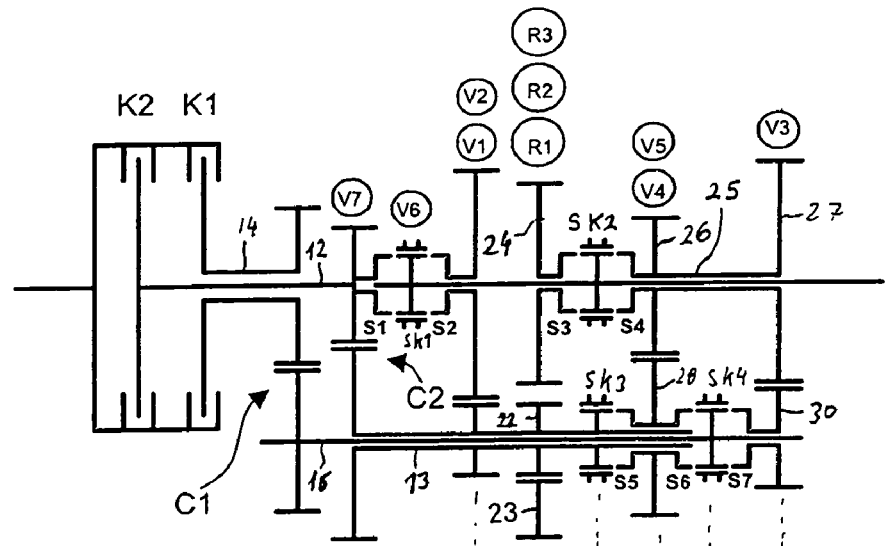
FIG. 17 shows a double clutch transmission in a fourth embodiment.
FIG. 18 shows a shift diagram of the double clutch transmission according to FIG. 17.

FIG. 17 shows a double clutch transmission in a fourth embodiment.

The construction of this double clutch transmission is identical, from the front as far as the fourth gearwheel plane ZE4, to the first embodiment, and therefore reference is made here to the latter.

In the shift clutch plane SKE2 following this gearwheel plane ZE4, the shift clutch SK2 is likewise identical to the first embodiment. In contrast to the first embodiment, however, in this shift clutch plane SKE2, a third shift clutch SK3 is additionally arranged which is designed as a "half" shift clutch SK3. This has, besides the neutral position, only one position for making a rotationally fixed connection. This is the position S5 for making a rotationally fixed connection between the first hollow shaft 13 and a loose wheel 28 which is arranged in a gearwheel plane ZE5 rotatably and coaxially on the hollow shaft 13 of the second part transmission 52 at the end of said hollow shaft.

A loose wheel 26 meshing with this loose wheel 28 in the gearwheel plane ZES is arranged rotatably and coaxially on the transmission output shaft 20. This loose wheel 26 is connected fixedly in terms of rotation by means of a second hollow shaft 25 to a gearwheel 27 which is consequently arranged as a loose wheel likewise coaxially and rotatably on the transmission output shaft 20.

The latter gearwheel 27 meshes, in a sixth and last gearwheel plane ZE6, with a loose wheel 30 which is arranged rotatably and coaxially on the inner shaft 16 at the rear end of the latter.

Between the fifth gearwheel plane ZE5 and the sixth gearwheel plane ZE6 lies a third shift clutch plane SKE3 with a shift clutch SK4. When the shift clutch SK4 is displaced forward, the latter, in a position S6 makes a rotationally fixed connection between the inner shaft 16 and the loose wheel 28. The hollow shaft 13 arranged between them in this case remains rotatable with respect to the inner shaft 16 and the loose wheel 28. By contrast, when the shift clutch SK1 is displaced rearward, the latter makes a rotationally fixed connection between the inner shaft 16 and the loose wheel 30.

FIG. 18 shows a shift diagram of the double clutch transmission according to FIG. 17. This shift diagram is described below for the individual gears V1 to V7 and R1 to R3:

In the first forward gear V1,
  the first power-shift clutch K1 is engaged,
  the first shift clutch SK1 is in the rear position S2,
  the second shift clutch SK2 is in the neutral position,
  the third shift clutch SK3 is in the engaged, that is to say, rear position S5, and
the fourth shift clutch SK4 is in the rear position S7.
  The first forward gear V1 is a wound gear. The power flux in this case runs axially,
  first five gearwheel planes rearward,
  then three gearwheel planes forward, and
thereafter, as far as the transmission output.
  In detail, the power flux runs successively
  from the transmission input shaft 10,
  via the first power-shift clutch K1,
  via the first intermediate shaft 14,
  via the first transmission constant C1,
  via the inner shaft 16,
  via the sixth gearwheel plane ZE6,
  via the second hollow shaft 25,
  via the fifth gearwheel plane ZE5,
  via a part region of the first hollow shaft 13, and
  via the third gearwheel plane ZE3,
to the transmission output shaft 20.
  In the second forward gear V2,
  the second power-shift clutch K2 is engaged,
  the first shift clutch SK1 is in the rear position S2,
  the second shift clutch SK2 is in the neutral position,
  the third shift clutch SK3 is likewise in the neutral position, and
  the fourth shift clutch SK4 is likewise in the neutral position.

Consequently, only the first shift clutch SK1 is engaged.
  The second forward gear V2 is in this case not a winding path gear. The power flux of the second forward gear V2 consequently runs successively,
  from the transmission input shaft 10,
  via the second power-shift clutch K2,
  via the second intermediate shaft 12,
  via the second transmission constant C2,
  via a front part region of the hollow shaft 13, and
  as the last transfer stage, just as in the first forward gear V1, via the third gearwheel plane ZE3,
to the transmission output shaft 20.
  In the third forward gear V3,
  the first power-shift clutch K1 is engaged,
  the first shift clutch SK1 is in the neutral position,
  the second shift clutch SK2 is in the rear position S4,
  the third shift clutch SK3 is in the neutral position, and
the fourth shift clutch SK4 is in the rear position S7.
  The third forward gear V3 is in this case not a winding path gear. The power flux of the third forward gear V3 consequently runs successively,
  from the transmission input shaft 10,
  via the first power-shift clutch K1,
  via the first intermediate shaft 14,
  via the first transmission constant C1,
  via the inner shaft 16,
  via the sixth gearwheel plane ZE6,
  via the hollow shaft 25,
to the transmission output shaft 20.
  In the fourth forward gear V4,
  the second power-shift clutch K2 is engaged,
  the first shift clutch SK1 is in the neutral position,
  the second shift clutch SK2 is in the rear position S4,
  the third shift clutch SK3 is in the rear position S5, and
the fourth shift clutch SK4 is in the neutral position.
  The fourth forward gear V4 is in this case not a winding path gear. The power flux of the fourth forward gear V4 consequently runs successively,
  from the transmission input shaft 10,
  via the second power-shift clutch K2,
  via the second intermediate shaft 12,
  via the second transmission constant C2,
  via the hollow shaft 13, and
  as the second and last transfer stage, via the fifth gearwheel plane ZE5,
to the transmission output shaft 20.
  In the fifth forward gear V5,
  the first power-shift clutch K1 is engaged,
  the first shift clutch SK1 is in the neutral position,
  the second shift clutch SK2 is in the rear position S4,
  the third shift clutch SK3 is in the neutral position, and
  the fourth shift clutch SK4 is in the front position S6.
The fifth forward gear V5 is in this case not a winding path gear. The power flux of the fifth forward gear V5 consequently runs successively,
  from the transmission input shaft 10,
  via the first power-shift clutch K1,
  via the first intermediate shaft 14,
  via the first transmission constant C1,
  via a large part of the inner shaft 16, and
  just as in the fourth forward gear V4, as the second and last transfer stage, via the fifth gearwheel plane ZE5,
to the transmission output shaft 20.
  In the sixth forward gear V6, the second power-shift clutch K2 is engaged. Just as in the case of the second forward gear V2, in the sixth forward gear V6, too, only one shift clutch is engaged. In the case of the sixth forward gear V6, this is likewise the first shift clutch SK1 which, however, is located in the front position S1. The three remaining shift clutches SK2, SK3, SK4 are located in the neutral position. It is clear that the sixth forward gear V6 is designed as a direct forward gear. In this direct forward gear, the second intermediate shaft 12 is connected fixedly in terms of rotation to the transmission output shaft 20, so that the sixth forward gear V6 has a transfer ratio of 1:1.
  In the seventh forward gear V7,
  the first power-shift clutch K1 is engaged,
  the first shift clutch SK1 is in the front position S1,
  the second shift clutch SK2 is in the neutral position,
  the third shift clutch SK3 is in the rear position S5, and
  the fourth shift clutch SK4 is in the front position S6.
The seventh forward gear V7 is in this case not a winding path gear. However, just as in the case of the first forward gear V1, the power flux runs axially back and forth in a part region. The power flux in this case runs axially,
  first four gearwheel planes rearward,
  then three gearwheel planes forward, and
  thereafter, as far as the transmission output.
In detail, the power flux runs successively
  from the transmission input shaft 10,
  via the first power-shift clutch K1,
  via the first intermediate shaft 14,
  via the first transmission constant C1,
  via the inner shaft 16,
  via the shift clutch SK4 which couples the inner shaft 16 fixedly in terms of rotation to the first hollow shaft 13 at the rear end of the latter via the ring wheel 28 and the shift clutch SK3, via the hollow shaft 13, and as the last transfer stage, via the second gearwheel plane ZE2 in which the transmission constant C2 lies, to the transmission output shaft 20.

In the first reverse gear R1,
the first power-shift clutch K1 is engaged,
the first shift clutch SK1 is in the neutral position,
the second shift clutch SK2 is in the front position S3,
the third shift clutch SK3 is in the engaged, that is to say rear position S5, and
the fourth shift clutch SK4 is in the rear position S7.

The first reverse gear R1 is a wound gear. The power flux in this case runs axially,
first five gearwheel planes rearward,
then two gearwheel planes forward, and,
thereafter, as far as the transmission output.

In detail, the power flux runs successively
from the transmission input shaft 10,
via the first power-shift clutch K1,
via the first intermediate shaft 14,
via the first transmission constant C1,
via the inner shaft 16,
via the sixth gearwheel plane ZE6,
via the second hollow shaft 25,
via the fifth gearwheel plane ZE5, and
via the fourth gearwheel plane ZE4, to the transmission output shaft 20.

The power flux of the first reverse gear R1 consequently runs similar to the power flux of the first forward gear V1, so that a virtually identical transfer ratio is obtained.

In the second reverse gear R2,
the second power-shift clutch K2 is engaged,
the first shift clutch SK1 is in the neutral position,
the second shift clutch SK2 is in the front position S3,
the third shift clutch SK3 is in the neutral position, and
the fourth shift clutch SK4 is in the neutral position.

Consequently, only the second shift clutch SK2 is engaged.

The second reverse gear R2 is in this case not a winding path gear. The power flux of the second reverse gear R2 consequently runs successively,
from the transmission input shaft 10,
via the second power-shift clutch K2,
via the second intermediate shaft 12,
via the second transmission constant C2,
via a front part region of the hollow shaft 13, and
as the last transfer stage, just as in the first reverse gear R1, via the three gearwheels 22, 23, 24 of the fourth gearwheel plane ZE4, to the transmission output shaft 20.

In the third reverse gear R3,
the first power-shift clutch K1 is engaged,
the first shift clutch SK1 is in the neutral position,
the second shift clutch SK2 is in the front position S3,
the third shift clutch SK3 is in the engaged, that is to say rear position S5, and
the fourth shift clutch SK4 is in the front position S6.

The third reverse gear R3 is in this case not a winding path gear. The power flux of the third reverse gear R3 consequently runs successively
from the transmission input shaft 10,
via the first power-shift clutch K1,
via the first intermediate shaft 14,
via the first transmission constant C1,
via the inner shaft 16,
via the gearwheel 28 to the hollow shaft 13, and
as the last transfer stage, just as in the first reverse gear R1 and in R2, via the three gearwheels 22, 23, 24 of the fourth gearwheel plane ZE4, to the transmission output shaft 20.

In the exemplary embodiments, all the fixed wheels and loose wheels are preferably designed as helically toothed or spur-toothed gearwheels.

In the method for shifting the double clutch transmission, in individual gears, at least one shift clutch not actively required for implementing the respective gear may optionally remain engaged, so that the number of shift clutches to be actuated during a gear change can thereby be kept low.

In the double clutch transmission, a gear prognosis and gear pre-selection device may be provided by means of which a gear selection takes place in the load-free part transmission 52 or 54, even though the desire for a shift has not yet been evinced.

In an alternative refinement, the double clutch transmission may have an even number of forward gears.

The embodiments described are merely exemplary embodiments. A combination of the features described for different embodiments is likewise possible.

What is claimed is:

1. A double clutch transmission with a winding-path arrangement, comprising two countershafts (16, 13) arranged coaxially with respect to one another, a number of transfer stages (ZE1, ZE6, ZE5, ZE4), a reverse gear (R1) with a power flux extending via more than two of the transfer stages (ZE1, ZE6, ZE5, ZE4), at least one further reverse gear (R2), seven forward gears (V1 to V7), and only four shift clutch planes (SKE1 to SKE4) being provided.

2. The double clutch transmission as claimed in claim 1, wherein the power path extending through the further reverse gear (R2) likewise extends through more than two transfer stages.

3. A double clutch transmission including two power shift clutches a winding-path arrangement, comprising two countershafts (16, 13) arranged coaxially with respect to one another, a plurality of gearwheel planes (ZE1 to ZE7) following one another axially as seen from input end to the output end of the transmission, said transmission including at least one gear (V1, R1), with a power flux extending via more than two gearwheel planes (ZE1, ZE6, ZE5, ZE4 or ZE1, ZE6, ZE5, ZE4) and extending axially, in a part region (ZE6 to ZE3 and ZE6 to ZE4), of the transmission from the output end back toward of the input end.

4. The double clutch transmission as claimed in claim 3, wherein the power flux for a first forward gear (V1) having the highest transmission ratio extends from the input end to the output end via more than two transfer stages (ZE1, ZE6, ZE5, ZE4).

5. The double clutch transmission as claimed in claim 3, wherein the power flux of at least one reverse gear (R1) extends via more than three transfer stages (ZE1, ZE6, ZE5, ZE4).

6. The double clutch transmission as claimed claim 3, wherein a progressive ratio transfer $\phi_{R1-R2}$ between
the first reverse gear (R1) having the highest reverse gear transfer ratio $i_{R1}$, and
the second reverse gear (R2) having the next lower reverse gear transfer ratio $i_{R2}$ in terms of amount corresponds to the progressive ratio transfer $\phi_{1-2}$ between the first two forward gears (V1 and V2) having the highest and the second highest transfer ratios.

7. The double clutch transmission as claimed in claim 3, wherein the progressive ratio transfer $\phi_{R2-R3}$ between the second reverse gear (R2) having the second highest reverse gear transfer ratio $i_{R2}$ and the third reverse gear (R3) having the next lower reverse gear transfer ratio $i_{R3}$ corresponds to the progressive ratio transfer $\phi_{2-3}$ between the second forward gear (V2) having the second highest transfer ratio $i_2$ and the third forward gear (V3) having the third highest transfer ratio $i_3$.

8. The double clutch transmission as claimed in claim 5, wherein the reverse gear (R1) extending in the power flux via more than three transfer stages is the reverse gear (R1) having the lowest reverse gear transfer ratio $i_{R3}$.

9. The double clutch transmission as claimed in claim 3, wherein at least two reverse gears are arranged in such a way that a shift can be carried out between these by a concurrent change from one power-shift clutches (K1 or K2) of the double clutch to the other power-shift clutch (K2 or K1).

10. The double clutch transmission as claimed in claim 3, wherein a single intermediate gearwheel (23) is provided for the reversal of direction of rotation in all reverse gears (R1, R2, R3).

11. The double clutch transmission as claimed in claim 10, wherein, for the reversal of direction of rotation in all reverse gears (R1, R2, R3), an intermediate shaft (34) is provided, which transfers the power flux from one gear (23) to another axially adjacent gear (33) with a certain transfer ratio.

12. The double clutch transmission as claimed in claim 10, wherein the double clutch transmission has first and second transmission constants (C1, C2), and in at least one transmission gear (V7) the power flux extends both via the first transmission constant (C1) and via the second transmission constant (C2) used as a transfer stage.

13. The double clutch transmission as claimed in claim 12, wherein in the at least one transmission gear (V7), the transmission constant (C2) used as a second transfer stage is coupled by means of a shift clutch (SK1) to the transmission output shaft (20) arranged coaxially with respect to a driving gearwheel (11) of the second transmission constant (C2), the same shift clutch (SK1) also being provided for the selection of a direct gear (V6).

14. The double clutch transmission as claimed in claim 3, wherein one of the forward gears, in particular the highest, the second highest or the third highest, is designed as a direct gear.

15. The double clutch transmission as claimed in claim 3, wherein seven forward gears (V1 to V7) and three reverse gears (R1 to R3) are selectable solely by means of four shift clutches (SK1 to SK4).

16. The double clutch transmission as claimed in claim 3, wherein a first transmission constant (C1) located nearer to the drive has a larger driving gearwheel than the second transmission constant (C2) arranged axially behind it.

17. The double clutch transmission as claimed in claim 3, wherein the power flux extends via the same transfer stage (ZE3)

both in the first forward gear (V1) having the highest transfer ratio and in the second forward gear (V2) having the second highest transfer ratio.

18. The double clutch transmission as claimed in claim 3, wherein the power flux extends via different transmission constants, but via the same gearwheel stage, in two forward gears which lie above the second forward gear.

19. The double clutch transmission as claimed in claim 3, wherein, for the implementation of seven forward gears (V1 to V7) and at least one reverse gear (R1 to R3), four shift clutches (SK1 to SK4) are provided, which can in each case be actuated into two engaged positions (S1 to S8) and one neutral position.

20. The double clutch transmission as claimed in claim 3, wherein the implementation of seven forward gears (V1 to V7) and at least one reverse gear (R1 to R3), four shift clutches (SK1 to SK4) are provided, three of which can in each case be actuated into two engaged positions (S1, S2, S3, S4, S6, S7) and one neutral position, and a further shift clutch can be actuated into one engaged position (S5) and one neutral position.

21. The double clutch transmission as claimed in claim 3, wherein a shift operation between two adjacent forward gears (V1, V2 in FIG. 2) can be carried out by means of the disengagement of at most one shift clutch (SKE3) or the engagement of one other shift clutch.

22. The double clutch transmission as claimed in claim 3, wherein a shift clutch (SK4) located outside the power flux in a particular gear (forward gear V2) is connected rotationally fixed between two transmission members (inner shaft 16, gearwheel 29 in FIG. 1).

23. The double clutch transmission as claimed in claim 22, wherein said shift clutch (SK4) lies within the power flux in a gear (V3) sequentially following the particular gear forward gear (V2).

24. A method for shifting a double clutch transmission including two power shift clutches a winding path arrangement, comprising two countershafts (16, 13) arranged coaxially with respect to one another, a plurality of gearwheel planes (ZE1 to ZE7) following one another axially, as seen from input end to the output end of the transmission, said transmission including at least one gear (V1, R1), with a power flux extending via more than two gearwheel planes (ZE1, ZE6, ZE5, ZE4 or ZE1, ZE6, ZE5, ZE4) and extending axially, in a part region (ZE6 to ZE3 and ZE6 to ZE4), of the transmission from the output end back toward of the input end, wherein for a sequential gear change from a source gear (VI) to a target gear (V2), only one shift clutch (SK3) is actuated.

25. The method for shifting a double clutch transmission as claimed in claim 24, wherein a shift clutch (SK4) in the second forward gear (V2) disposed lying in the power flux in the source gear (V1) and lying outside the power flux in the target gear (V2) remains in the engaged position (S7) after the shift into the target gear (V2) has been carried out.

* * * * *